UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

MANUFACTURE OF REFRACTORY FURNACE-LININGS AND FIRE-BRICK.

SPECIFICATION forming part of Letters Patent No. 265,077, dated September 26, 1882.

Application filed August 31, 1882. (No specimens.)

*To all whom it may concern:*

Be it known that I, JAMES HENDERSON, of Bellefonte, Pennsylvania, (formerly of New York,) have made a new and useful invention of a Compound for Furnace-Linings and Fire-Brick, of which the following is such full, clear, and exact description as will enable others skilled in the art to make and use the same.

My invention relates to a compound of silica or sand and water, in conjunction with vegetable substances from which sugar or starch may be derived to give a binding quality to the compound.

In a previous application I have specified that glucose may be used with silica or sand in making compounds for furnace-linings or fire-brick, but have not claimed the same therein. My present invention relates to the use of vegetable substances, whether soluble or not in water, which contain sugar or starch, or from which either sugar or starch may be derived, with sand and water, in making compounds for furnace-linings or fire-brick.

For the purpose of this invention glucose, dextrine, cellulose, starch, gum-arabic, mucilage, molasses, or like substances which contain sugar or starch, or from which either may be derived, and are soluble in water, may be used; or rye, wheat, barley, rice, Indian corn, oats, or like grain, when reduced to a flour or meal, or potatoes or other vegetables, when made into a fine flour by cooking or otherwise, or wood pulp or other vegetable substance from which sugar or starch may be derived, may be used in a finely-divided state, when mixed with water to the consistency of a thin gum or paste, which is mixed with the sand to the consistency of thick mortar, which may be applied wet to the interior of furnaces, converters, or other vessels for metallurgic purposes as a lining, and when dried is ready for use; or the compound may be molded into brick and dried, and the brick be used as linings or as fire-brick.

Furnace-linings and fire-brick made of the compound herein described are hard and refractory, and economical of manufacture, and when well dried are readily handled without injury.

In carrying out this invention I use the purer qualities of sea-sand or pulverized sandstone, and preferably reduced to the fineness of flour, or so that it will pass through a sieve of about three thousand six hundred meshes to the square inch. The presence of the vegetable substance in even small amounts will hold the sand together and make a good compound, although sufficient should be used to give a good binding quality to the compound.

What I claim as new, and desire to secure by Letters Patent, is—

The compound for furnace-linings and fire-brick, consisting of silica, a vegetable substance from which sugar or starch may be derived, and water, as specified and set forth.

JAMES HENDERSON.

Witnesses:
H. H. BENNER,
D. M. GLENN.